(12) United States Patent
Bui et al.

(10) Patent No.: US 8,534,819 B2
(45) Date of Patent: Sep. 17, 2013

(54) INK COMPOSITION AND METHOD OF USE

(76) Inventors: Loc Bui, Moorpark, CA (US); Ramesh Babu, Fullerton, CA (US); Snehal Desai, Irvine, CA (US); Barry Brucker, Beverly Hills, CA (US); Nadeepuram K. Ranganathan, Irvine, CA (US)

( * ) Notice: Subject to any disclaimer, the term of this patent is extended or adjusted under 35 U.S.C. 154(b) by 817 days.

(21) Appl. No.: 12/311,637

(22) PCT Filed: May 5, 2007

(86) PCT No.: PCT/US2007/010988
§ 371 (c)(1), (2), (4) Date: Apr. 6, 2009

(87) PCT Pub. No.: WO2008/136795
PCT Pub. Date: Nov. 13, 2008

(65) Prior Publication Data
US 2010/0075039 A1 Mar. 25, 2010

(51) Int. Cl.
*G01D 11/00* (2006.01)
(52) U.S. Cl.
USPC ........... 347/100; 347/95; 106/31.13; 523/160
(58) Field of Classification Search
USPC .. 347/100, 95, 96, 101, 102, 103; 106/31.27, 106/31.13, 31.6; 523/160, 161
See application file for complete search history.

(56) References Cited

U.S. PATENT DOCUMENTS

| 5,453,122 | A | 9/1995 | Lyon | |
|---|---|---|---|---|
| 5,746,817 | A | 5/1998 | Katsen et al. | |
| 5,800,601 | A | 9/1998 | Zou et al. | |
| 6,019,827 | A | 2/2000 | Wickramanayake et al. | |
| 6,538,049 | B1 | 3/2003 | Kappele et al. | |
| 2004/0186199 | A1* | 9/2004 | Wang et al. | 523/160 |
| 2004/0189762 | A1* | 9/2004 | Chen et al. | 347/100 |
| 2004/0189763 | A1* | 9/2004 | Zheng et al. | 347/100 |
| 2007/0081061 | A1* | 4/2007 | Ryu et al. | 347/100 |

FOREIGN PATENT DOCUMENTS
EP 0781819 7/1997

\* cited by examiner

*Primary Examiner* — Manish S Shah
(74) *Attorney, Agent, or Firm* — Mind Law Firm, P.C.; Jeromye V. Sartain; Justin G. Sanders

(57) ABSTRACT

An ink and method of its use for printing on a variety of substrates in a first aspect involves a water-insoluble colorant, water, and a primary solvent such as diacetone alcohol capable of dissolving both the water-insoluble colorant and the water. In a further aspect, the ink composition includes a secondary solvent capable of modifying the properties of the ink, the secondary solvent being selected from the group consisting of alcohols, amines, esters, glycol ethers, ketones, polyols, and keto-pyrroles. In a still further aspect, the ink may have at least two polyols, including a first polyol characterized by being semi-solid at operating temperature and a second polyol characterized by being liquid at operating temperature. In a further aspect, the ink composition includes a surfactant selected from the group consisting of hydrocarbon-based surfactants, silicone-based surfactants, and fluorosurfactants.

29 Claims, No Drawings

INK COMPOSITION AND METHOD OF USE

TECHNICAL FIELD

Aspects of this invention relate generally to inks, and more particularly to ink compositions and methods of their use in printing systems.

BACKGROUND ART

In the industrial printing market, there exists a need for a low cost, high performance printing system that enables imaging of data onto a variety of porous and/or non-porous substrates. The technologies most often employed in the industrial printing market are continuous inkjet and drop-on-demand inkjet.

With regard to continuous inkjet systems, solvent based inks are typically the inks of choice to print on the various substrates required. The ink composition is typically based on solvents, e.g., methyl ethyl ketone ("MEK") and/or alcohol, and one or more solvent-soluble colorants. Inks for continuous inkjet systems are generally conductive since an electrostatic charging device is used to assist in directing the continuous stream of ink droplets. In such continuous inkjet systems, the ink droplets to be imaged are jetted from a nozzle as a continuous stream and directed to a substrate. The un-imaged or unused ink droplets are recycled back into the bulk ink feed system. Due to the high volatility nature of solvent-based inks and the recycling of the un-imaged ink droplets, a make-up solution comprising an effective concentration of the solvent(s) is typically used to compensate for the loss in solvent(s) during printing.

Due to the high volatility of continuous inkjet inks, a plurality of problems is often encountered with continuous inkjet technology. Volatile inks tend to generate volatile organic compounds ("VOCs") that are not environmentally friendly upon the loss of the solvent(s). Loss of the solvent(s) from such volatile inks also tends to cause the ink to increase in viscosity. To compensate for the loss of solvents(s) and the resulting increase in viscosity, again, make-up solution is added. The addition of make-up solution increases the cost of operation. Furthermore, the variability in the physical properties of the ink due to the loss of solvent(s) and the compensation by the make-up solution creates variability in quality of the printed image. As a result of these factors, and due to the relative complexity of the technology more generally, continuous inkjet systems ultimately tend to be expensive to own and maintain.

To overcome the volatility problems related to solvent inks used in continuous inkjet system, and in the alternative, hot melt ink may be employed using a drop-on-demand printing system. In such hot melt ink printing system, the ink composition is typically based on low molecular weight waxes and oil soluble colorant(s). The ink is typically a solid at room temperature. During the imaging process, the ink is heated up above the melting point to an effective temperature where the ink is jettable. The molten ink is jetted from the nozzles of the print head and onto the desired substrate via a micro piezo-actuated device. The molten ink droplets freeze on top of the substrate to form the desired image. Since this is a solid ink system, there is no solvent being lost to evaporation. However, the printed images tend to suffer from a lack of image durability. The solid printed image sitting on top of the substrate tends to mar and scuff relatively easily when it comes into contact with various feeding rollers in the industrial printing environment, often rendering the image even illegible. Furthermore, the typical hot melt inkjet printing system does nothing to remedy the high system and maintenance cost problems that result primarily from the expensive low volume print head design and manufacturing and from the high power requirement to heat the system and print head(s).

Thus, although solid ink drop-on-demand technology resolves the volatility problem of continuous inkjet technology by not using solvents, the cost issues have not been resolved. In addition, hot melt ink technology tends to suffer from a durability problem of the printed image.

Recently, then, new drop-on-demand printing systems based on thermal inkjet technology available from Hewlett Packard® and others have been integrated for the industrial printing market. Such thermal inkjet technology is based on the disposable, inexpensive print head technology that has been commercially successful in the high volume office printing market for many years. Integrators of the thermal inkjet technology have been able to simultaneously address both issues of high system cost and maintenance cost.

In thermal ink jet technology, the ink composition is typically based on water and glycols. The colorants typically are water soluble dyes or water dispersible pigments. Because of the inherent water solubility of water-soluble dyes, the images printed from these inks suffer from a lack of water-fastness. Whereas, the use of water-based inks for thermal inkjet systems have found great commercial success in printing on porous or absorbent substrates. However, water based inks are notorious for requiring appropriate substrates to be selected for optimum print quality and when printed on non-porous substrates often suffer from low edge acuity, poor wetting, inadequate drying, coalescence in the halftone image, mottling, smudging, low optical density, poor adhesion to the substrate, lack of waterfastness, and other such problems. Furthermore, thermal inkjet technology is prone to long-term reliability issues such as nozzles clogging from dried ink at the orifices, kogation due to thermal degradation at the resistors, or corrosion due to oxidative problems.

In sum, there are several disadvantages to the aforementioned methods. Continuous inkjet systems may be expensive to own and maintain. Additionally, continuous inkjet inks might be highly volatile, might create print quality problems, might generate VOCs into the environment, and might add cost to the operation. Hot melt drop-on-demand inkjet systems may be able to resolve the issues related to volatility found in continuous inkjet systems. However, hot melt inkjet systems generally introduce printed images of low durability without resolving the cost issues. Thermal inkjet systems may be able to resolve the cost and ink volatility issues. However, thermal inkjet systems introduce problems with printing on non-porous substrates. Thus, the prior art described above teaches inks and ink systems that may be relatively inexpensive to operate, relatively non-volatile, or relatively successful in printing quality images on non-porous substrates, but does not teach inks and ink systems that are capable of achieving all three of these objectives. Aspects of the present invention fulfill these needs and provide further related advantages as described in the following disclosure.

DISCLOSURE OF THE INVENTION

Aspects of the present invention teach certain benefits in formulation and use which give rise to the exemplary advantages described below.

Generally, the inventors herein realize, in one aspect of the invention, that there is a need for a versatile ink to enable printing using thermal inkjet technology or the like on a variety of porous and non-porous substrates required in industrial printing applications. Such substrates include but are not limited to coated offset paper, low surface energy plastic, glass, or metal. In another aspect of the invention, the inventors herein realize that by replacing the water-soluble dye in the aqueous ink composition of the typical thermal ink jet printing system with water-insoluble dye the waterfastness problem often encountered with aqueous inks may be resolved. In yet another aspect of the invention, the inventors herein realize that to incorporate one or more water-insoluble colorants in an ink to be jettable in a thermal inkjet system, water might need to be included as a propellant and a further solvent added that can solubilize the water-insoluble colorant.

The present invention is generally directed to an ink composition and methods of its use in printing on various substrates, including non-porous substrates.

An aspect of the present invention may then be generally described as an ink composition comprising a water-insoluble colorant, water, and a primary solvent capable of dissolving both the water-insoluble colorant and the water.

A further aspect of the present invention may be generally described as an ink composition comprising a secondary solvent capable of modifying the properties of the ink, the secondary solvent being selected from the group consisting of alcohols, amines, esters, glycol ethers, ketones, polyols, and keto-pyrroles.

A still further aspect of the present invention may be described as an ink composition comprising at least two polyols, including a first polyol characterized by being semi-solid at operating temperature and a second polyol characterized by being liquid at operating temperature.

A further aspect of the present invention may be generally described as an ink composition comprising a surfactant selected from the group consisting of hydrocarbon-based surfactants, silicone-based surfactants, or fluorosurfactants.

A still further aspect of the present invention may be described as an ink composition comprising at least two surfactants mixed in the ink either as a fluorosurfactant with a hydrocarbon-based surfactant or as a silicone-based surfactant with a hydrocarbon-based surfactant.

A still further aspect of the present invention may be described an ink composition wherein the primary solvent dissolves at least about two percent by weight (2 wt %) of the colorant and dissolves the water in the range of about five percent by weight (5 wt %) to about ninety-five percent by weight (95 wt %).

A still further aspect of the present invention may be described as an ink composition comprising a colorant having no greater than about one percent solubility by weight (1 wt %) per one hundred grams (100 g) of water.

A yet further aspect of the present invention may be generally described as an ink composition comprising a resin.

A still further aspect of the present invention may be generally described as an ink composition comprising a biocide reagent.

Other features and advantages of aspects of the present invention will become apparent from the following more detailed description which illustrates, by way of example, the principles of aspects of the invention.

MODES FOR CARRYING OUT THE INVENTION

The above disclosure illustrates aspects of the invention in at least one of its exemplary embodiments, which are further defined in detail in the following modes.

The subject of this patent application is an ink composition generally comprising a primary solvent, a water-insoluble dye, and water. These three ingredients and other additives such as secondary solvents (including low molecular weight and high molecular weight polyols), surfactants, resins, and biocide reagents may be combined in various proportions depending on the application to arrive at new and useful ink compositions according to the present invention. As used herein, an "effective amount" or "effective concentration" of any such ingredient or additive of any particular ink composition refers to the minimal percentage of a substance used in an ink composition of the present invention to achieve the desired effect. For example, an effective amount of dye refers to the minimal percentage of dye required to achieve the desired color and/or optical density. While specific substances in each broad category of ingredients are described as being combined in certain proportions to yield one or more particular ink compositions, it will be appreciated by those skilled in the art that the invention is not so limited. Rather, numerous other substances, now known or later developed, and combinations thereof are possible beyond those described herein without departing from the spirit and scope of the invention.

Solvents

Solvents suitable for the ink compositions of the present invention may comprise several classifications of solvents, most of which are organic, though this is not required. The first general classification of solvent may be a primary solvent, which may be capable of dissolving the water-insoluble dyes while having substantially good solubility with water. For example, substantially good dye solubility may denote that the solvent may be able to dissolve about at least two percent (2%) by weight of the dye per about one hundred (100) grams of the solvent. Whereas, substantially good water solubility may denote that the solvent may be soluble in water in the range of about five percent (5%) by weight to about ninety-five percent (95%) by weight. In an embodiment of the present invention, diacetone alcohol may be an example of a primary solvent.

In contrast to prior art solvent inks for continuous inkjet printing, ink compositions of the present invention have water that may act as a propellant for thermal inkjet printing. Unlike prior art aqueous inks for thermal inkjet printing, ink compositions of the present invention have a primary solvent capable of dissolving both water-insoluble dye and water. Advantageously, images being printed with ink compositions having water-insoluble dye are waterfast upon drying.

Other organic solvents suitable for the ink compositions of the present invention may include secondary solvents used as additives to modify the properties of the ink composition. Examples of secondary solvents include, but are not limited to, alcohols, amines, esters, glycol ethers, ketones, polyols, and keto-pyrroles.

Alcohol may typically be employed as a secondary solvent in various ink compositions of the present invention, if at all, to modify the drying property of the resulting ink. Alcohols suitable for the ink compositions of the present invention may include, but are not limited to, methanol, ethanol, isopropyl alcohol, n-propyl alcohol, tert-butanol, n-pentanol, benzyl alcohol, and derivatives thereof. For example, methanol may be added to an ink composition of the present invention to increase the drying rate. To slow down the drying rate of an ink composition, benzyl alcohol may be added. An effective concentration of alcohol may be empirically determined relative to the desired end use application to balance between the problem of crusting at the nozzles and achieving the desired drying rate. In an exemplary embodiment of the present invention, alcohol may typically be present in the range of about one percent (1%) to about seventy-five percent (75%) by weight, more preferably in the range of about two percent (2%) to about fifty percent (50%) by weight, and even more preferably in the range of about five percent (5%) to about forty percent (40%) by weight.

Polyols may generally be added to various ink compositions of the present invention for their humectant property. Humectants may play an important role in any ink formulation in preventing crusting at the nozzles. Fast drying inks of the type described in the various inventive embodiments of the present invention might be more susceptible to nozzle crusting than slower drying inks of the prior art, i.e., conventional aqueous ink compositions for thermal inkjet printing systems. Polyols suitably employed in the ink compositions of the present invention may include, but are not limited to, ethylene glycol, diethylene glycol, triethylene glycol, tetraethylene glycol, propylene glycol, dipropylene glycol, tripropylene glycol, glycerol, butanediol, pentanediol, hexanediol, polyethylene glycol 200, polyethylene glycol 400, polyethylene glycol 600, and derivatives thereof.

In an exemplary embodiment of the present invention, a first polyol described as a high molecular weight polyol ("HMWP") that is semi-solid at operating temperature may be preferred. An example of a high molecular weight polyol may be polyethylene glycol 600 ("PEG-600"). It is contemplated that an HMWP such as PEG-600 will form soft plugs instead of hard plugs at the nozzles during latency, i.e., when the printer is in the idle state and fast evaporating solvents would be lost to the surrounding environment.

In another exemplary embodiment of the present invention, a second polyol described as a low molecular weight polyol ("LMWP") that is liquid at operating temperature may be employed to enhance the latency of the printer while in the idle state. An example of an LMWP might be glycerol. Here it is contemplated that an LMWP such as glycerol will act as a plasticizer for the HMWP, such as PEG-600, to form enhanced soft plugs as the ink dries at the nozzles. It is further hypothesized that the enhanced soft plugs will prevent the nozzles from forming irrecoverable hard plugs that might require user intervention such as manually cleaning the nozzle plate with solvent to remove the hard plugs. As will be appreciated by those skilled in the art, various semi-solid polyols or derivatives thereof may be employed as the HMWPs. Analogously, various liquid polyols or derivatives thereof may be employed as the LMWPs. Furthermore, mixtures of one or more HMWPs and/or one or more LMWPs may be employed in various combinations to achieve enhanced soft plugs suitable to particular applications. It will be further appreciated that while polyols have been described as the material from which the soft plugs are formed, the invention is not so limited. Rather, various other semi-solid materials soluble in the particular ink base solution, whether solvent, water, some other substance now known or later developed, or any combination thereof, may be employed without departing from the spirit and scope of the invention.

In contrast to prior art solvent inks for continuous inkjet printing, ink compositions having at least one of HMWP and LMWP to form the soft plug at the nozzles do not suffer from loss of solvent during low duty cycle printing or idle state. Thus, ink compositions having at least one of HMWP and LMWP do not need make-up solution to balance viscosity due to loss of VOC. Furthermore, unlike prior art aqueous inks for thermal inkjet printing, ink compositions having at least one of HMWP and LMWP to form soft plug at the nozzles may not suffer from hard-plug or nozzle-crusting due to loss of solvent during low duty cycle printing or idle state.

Suitable glycol ethers employed in various ink compositions of the present invention may include, but are not limited to, propylene glycol methyl ether ("glycol ether PM" or "GEPM"), dipropylene glycol methyl ether, tripropylene glycol methyl ether, propylene glycol ethyl ether, propylene glycol normal propyl ether, dipropylene glycol normal propyl ether, dipropylene glycol normal butyl ether, dipropylene glycol normal butyl ether, tripropylene glycol normal butyl ether, dipropylene glycol tertiary butyl ether, diethylene glycol methyl ether, diethylene glycol ethyl ether, diethylene glycol butyl ether, and derivatives thereof.

Esters suitably employed in the ink compositions of the present invention may include, but are not limited to, amyl acetate, iso-butyl acetate, n-butyl acetate, glycol ether DB acetate, glycol ether EB acetate, glycol ether DE acetate, glycol ether EE acetate, glycol ether EM acetate, glycol ether PM acetate, ethyl acetate, ethyl-3-ethoxy propinate, isopropyl acetate, n-propyl acetate, isobutyl isobutyrate, dibasic ester, and derivatives thereof.

Glycol ethers and esters might be used as co-solvents to balance various properties of a particular ink composition of the present invention. In an exemplary embodiment, a relatively fast-evaporating solvent such as ethyl acetate may be used to increase the drying rate of an ink composition. Alternatively or concurrently, a relatively slow-evaporating solvent such as glycol ether PM acetate may be used to decrease the drying rate of an ink composition. In an alternative exemplary embodiment, glycol ethers and esters may be added to an ink composition in various combinations and effective percentages by weight to achieve the desired balance in properties.

Amine may generally be used to increase the pH of an ink composition to help with dissolving various dyes such as "direct dyes" or various resins such as acrylics. Amines suitable for the ink compositions of the present invention may include, but are not limited to, ethylenediamine, diethylenetriamine, triethylenetetriamine, diethanolamine, triethanolamine, and derivatives thereof.

Keto-pyrroles may be five-membered lactams such as n-methylpyrrolidone 2-pyrrolidone and derivatives thereof. Keto-pyrroles might be used to help increase the solubility of an ink composition due to their inherent relatively good solvency.

Various mixtures of the aforementioned primary and secondary solvents may be selected at an effective concentration in terms of percentage by weight for particular ink formulation according to aspects of the present invention, thereby providing balance of the desired properties, as will be appreciated by those skilled in the art. Important properties for selecting appropriate solvents for a fast-drying thermal inkjet ink to print on a wide range of non-porous substrates include one or more of the following: substantial solubility with water; desirable evaporating rate; substantial miscibility with water; relatively low toxicity; relatively low viscosity; substantially complete dissolution of water-insoluble dyes; and substantially complete dissolution of resin. In an exemplary embodiment of the present invention, organic solvents or mixtures thereof are typically present in the range of about ten percent (10%) to about ninety percent (90%) by weight, more preferably in the range of about fifteen percent (15%) to about seventy-five percent (75%) by weight, and even more preferably in the range of about twenty percent (20%) to about sixty percent (60%) by weight.

Colorants

The ink compositions of the present invention generally comprise a colorant which might be a dye or combination thereof, i.e., a dye or a mixture of dyes. The terms "dye" and "colorant" are used interchangeably throughout. Any colorant that may be dissolved in the ink composition to achieve the targeted color and optical density may be used in the present invention.

The selected colorants suitable for the various ink compositions of the present invention may be dyes that are substantially or completely soluble in solvents and substantially or completely insoluble in water. For example, a solvent dye with solubility in the solvent has at least about two percent (2%) solubility by weight per one hundred (100) grams of solvent. Whereas, a solvent dye with substantially minimal solubility in water has at the maximum about one percent (1%) solubility by weight per one hundred (100) grams of water. In most cases, the solvent dye might have no solubility in water, i.e., zero percent (0%) solubility by weight per one hundred (100) grams of water.

Examples of suitable colorants may include, but are not limited to, Solvent Yellow 2, Solvent Yellow 5, Solvent Yellow 13, Solvent Yellow 14, Solvent Yellow 15, Solvent Yellow 16, Solvent Yellow 18, Solvent Yellow 19, Solvent Yellow 21, Solvent Yellow 33, Solvent Yellow 43, Solvent Yellow 44, Solvent Yellow 51, Solvent Yellow 56, Solvent Yellow 62, Solvent Yellow 72, Solvent Yellow 77, Solvent Yellow 82, Solvent Yellow 90, Solvent Yellow 93, Solvent Yellow 98, Solvent Yellow 109, Solvent Yellow 114, Solvent Yellow 145, Solvent Yellow 163, Solvent Yellow 167, Solvent Yellow 176, Solvent Green 5, Solvent Red 1, Solvent Red 2, Solvent Red 3, Solvent Red 4, Solvent Red 8, Solvent Red 13, Solvent Red 18, Solvent Red 23, Solvent Red 24, Solvent Red 25, Solvent Red 26, Solvent Red 27, Solvent Red 30, Solvent Red 32, Solvent Red 49, Solvent Red 52, Solvent Red 79, Solvent Red 89, Solvent Red 109, Solvent Red 111, Solvent Red 119, Solvent Red 122, Solvent Red 127, Solvent Red 130, Solvent Red 132, Solvent Red 135, Solvent Red 146, Solvent Red 160, Solvent Red 168, Solvent Red 169, Solvent Red 172, Solvent Red 175, Solvent Red 179, Solvent Red 197, Solvent Red 207, Solvent Red 218, Solvent Violet 8, Solvent Violet 9, Solvent Violet 11, Solvent Violet 13, Solvent Violet 14, Solvent Violet 31, Solvent Violet 38, Solvent Violet 56, Solvent Blue 4, Solvent Blue 5, Solvent Blue 6, Solvent Blue 8, Solvent Blue 13, Solvent Blue 23, Solvent Blue 24, Solvent Blue 35, Solvent Blue 36, Solvent Blue 38, Solvent Blue 48, Solvent Blue 58, Solvent Blue 59, Solvent Blue 70, Solvent Blue 74, Solvent Blue 78, Solvent Blue 98, Solvent Blue 102, Solvent Blue 104, Solvent Blue 128, Solvent Green 1, Solvent Green 3, Solvent Green 5, Solvent Orange 20, Solvent Orange 54, Solvent Orange 56, Solvent Orange 58, Solvent Orange 60, Solvent Orange 62, Solvent Orange 63, Solvent Orange 86, Solvent Orange 99, Solvent Brown 41, Solvent Brown 43, Solvent Black 3, Solvent Black 5 (Spirit Nigrosine), Solvent Black 7, Solvent Black 13, Solvent Black 27, Solvent Black 28, Solvent Black 29, and Solvent Black 34.

The colorant might be present in an ink composition according to the present invention in the range of about a half percent (0.5%) to about twelve percent (12%) by weight, more preferably in the range of about one percent (1%) to about seven percent (7%) by weight, and even more preferably in the range of about two percent (2%) to about five percent (5%) by weight. The effective concentration of the colorant may depend on the percentage by weight of the colorant required in the ink composition to produce the desired color and optical density.

In contrast to prior art solvent inks for continuous inkjet printing, ink compositions having water-insoluble dye may be formulated with water by employing a suitable primary solvent. Furthermore, unlike prior art aqueous inks employing water-soluble dyes for thermal inkjet printing, ink compositions having water-insoluble dye may be formulated with water by employing a suitable primary solvent.

Surfactants

Surfactants suitable for use in the various ink compositions of the present invention may comprise ionic, zwitterionic (amphoteric), and/or non-ionic surfactants. Surfactants are surface active agents that contain both hydrophobic groups and hydrophilic groups. Surfactants may generally be characterized by the presence of a charge on the hydrophilic group of the molecule. For example, non-ionic surfactants might have no charge on the hydrophilic portion of the molecule; whereas, ionic surfactants might have a net charge on the hydrophilic portion of the molecule. Negatively charged surfactants are called anionic surfactants, whereas, positively charged surfactants are called cationic surfactants. Furthermore, surfactants with two oppositely charged groups on the hydrophilic portion of the molecule are called zwitterionic surfactants. More generally, surfactants may be hydrocarbon-based surfactants, silicone-based surfactants, or fluorosurfactants.

Examples of suitable hydrocarbon-based surfactants may include, but are not limited to, acetylenic-based surfactants. For example, acetylenic surfactants available from Air Products™ and suitable for use in ink compositions according to the present invention include, but are not limited to, Dynol™ 604, Dynol™ 607, Surfynol® 104, Surfynol® 104A, Surfynol® 104BC, Surfynol® 104DPM, Surfynol® 104E, Surfynol® 104H, Surfynol® 104NP, Surfynol® 104PA, Surfynol® 104PG50, Surfynol® 104S, Surfynol® 2502, Surfynol® 420, Surfynol® 440, Surfynol® 465, Surfynol® 485, Surfynol® 485W, Surfynol® 502, Surfynol® 61, Surfynol® SE, Surfynol® SE-F, and Surfynol® TG-E. Other suitable non-ionic surfactants available from Air Products™ include Carbowet® 106 and Carbowet® 109.

Examples of suitable silicone-based surfactants may include, but are not limited to, CoatOSil® 1211, CoatOSil® 2400, CoatOSil® 2810, CoatOSil® 2812, CoatOSil® 2815, CoatOSil® 3500, CoatOSil® 3501, CoatOSil® 3503, CoatOSil® 3505, CoatOSil® 3509, CoatOSil® 3573, Silwet® L-77, Silwet® L-7001, Silwet® L-7200, Silwet® L-7210, Silwet® L-7220, Silwet® L-7230, Silwet® L-7280, Silwet® L-7500, Silwet® L-7510, Silwet® L-7550, Silwet® L-7600, Silwet® L-7602, Silwet® L-7604, Silwet® L-7605, Silwet® L-7607, Silwet® L-7608, Silwet® L-7650, and Silwet® L-8610. Examples of the CoatOSil® and Silwet® surfactants are available from Crompton Corp. (Union Carbide™ or OSi Specialties™).

Examples of suitable fluorosurfactants may include, but are not limited to, Zonyl® FSP, Zonyl® FSO, Zonyl® FSA, Zonyl® FSN-100, Zonyl® FSO-100, and Zonyl® FSG. Examples of the Zonyl® surfactants are available from DuPont™.

In an exemplary embodiment of the present invention, improved stability of drop formation during ink jetting is attributable, in addition to lowering the surface tension of the ink for wetting on low energy, non-porous surfaces, at least in part, to mixing a fluorosurfactant with a hydrocarbon-based surfactant or mixing a silicone-based surfactant with a hydrocarbon-based surfactant. It is contemplated that such mixtures of surfactants may reduce both the static and dynamic surface tension. It is known that high frequency jetting of ink droplets creates a dynamic situation wherein new surfaces are being created at the nozzles as the ink droplets are being ejected at a relatively small time scale, on the order of milliseconds or less. Therefore, it is postulated that an ink with dynamic surface tension similar to its static surface tension will be able to stabilize the meniscus at the nozzles faster before the next ink droplet is ejected. Furthermore, generally low surface tension ink may wet low energy surfaces better, thereby producing images free of the aforementioned print quality defects often produced by prior art TIJ aqueous inks.

The surfactant(s) or a mixture thereof may be present in an ink composition in the range of five hundredths percent (0.05%) to about three percent (3%) by weight, more preferably in the range of about seventy-five thousandths percent (0.075%) to about two percent (2%) by weight, and even more preferably in the range of about one tenth percent (0.1%) to about one-and-a-half (1.5%) by weight. The effective concentration of the surfactant(s) may depend on the percentage by weight of the surfactant required in the ink composition to produce the desired surface tension and wetting properties.

Resins

Examples of suitable water-soluble and water-dispersible resins that may be included in various ink compositions of the present invention include, but are not limited to, acrylic, polyvinyl alcohols, polyvinyl pyrollidone, polyester emulsion, styrene maleic anhydride, cellulose acetate resins, and derivatives thereof. Analogously, suitable solvent-soluble resins with tolerance for water may include, but are not limited to, acrylic, cellulose acetate, polyketone, polyvinyl alcohol, phenolic, novolac resins, and derivatives thereof.

Examples of the aforementioned resins or polymers may be available as Joncryl® manufactured by S.C. Johnson, PVP manufactured by Air Products™, MOWIOL® manufactured by Clariant™, and Synthetic Resin DS manufactured by Degussa™.

Additives

Biocide reagents for use in various ink compositions according to aspects of the present invention may include, but are not limited to, 2-bromo-2-nitropropane-1,3-diol, 4,4-dimethyloxazolidine, 7-ethyl bicyclooxazolidine, 2,6-dimethyl-m-dioxan-4 of acetate, 1,2-benzisothiazolin-3-one, sodium o-phenylphenate, 1-(3-chloroally)-3,5,7-triaza-1-azoniaadamantane chloride, glutaraldehyde, sodium hydroxymethylglycinate, 2[(hydroxymethyl)amino]ethanol, 5-hydroxymethyl-1-aza-3,7-dioxabicyclo(3.3.0)octane, n-methyl-2-hydroxymethyleneoxypropyl-2'-hydroxypropylamine, alkyl amine hydrochlorides, tetrahydro-3,5-dimethyl-2h-1,3,5-thiadiazine-2-thione, tributyltin benzoate, and derivatives thereof.

Examples of the aforementioned biocide reagents may be available as Nuosept® manufactured by Huls America (International Specialty Products™), Proxel® GXL manufactured by Arch UK Biocides (Avecia™), Bioban® and Canguard® manufactured by Angus Chemical Co., Dowicide® and Dowicil® manufactured by Dow Chemical Co., and Ucarcide® manufactured by Union Carbide Corp.

Exemplary Formulations

The following non-limiting examples illustrate ink compositions according to aspects of the present invention suitable for jetting in an industrial thermal inkjet system such as the JETPACK 1000™ available from Prism, Inc. The exemplary formulations should not be construed in any way as limitations on the present invention, but should be understood merely as illustrative of the principles of the invention and instructive of at least one preferred ink composition based on current materials and data. The following ink formulations may be made using conventional ink mixing equipment.

| Ink Formula (as percent by weight) | 02-0026.29 | 02-0026.37 | 02-0026.42 | 02-0026.43 | 02-0026.46 |
|---|---|---|---|---|---|
| Diacetone alcohol | 30 | 24 | 24.5 | 25 | 25 |
| Methanol | 20 | 26 | 26.5 | 26.6 | 26 |
| M-Pyrollidone | 0 | 5 | 4 | 3 | 3 |
| ethyl acetate | 5 | 4 | 4 | 5 | 5 |
| Glycol ether PM acetate (GEPM Acetate) | 5 | 3 | 3 | 2.8 | 2.8 |
| Glycol ether PM (GEPM) | 5 | 4 | 4 | 4 | 4 |
| Triethanolamine (TEA) | 0 | 0 | 0 | 0 | 0.2 |
| Joncryl 62 (30%) | 0 | 0 | 0 | 0 | 2 |
| Valifast Black 3808 (SK 29) | 5 | 4 | 3.5 | 3.5 | 3.5 |
| Ethylene Glycol | 10 | 6 | 6 | 6 | 6 |
| PEG-600 | 0 | 0.5 | 0.5 | 0.5 | 0.5 |
| Water | 19.5 | 19.5 | 20.5 | 20 | 18.4 |
| Dynol 604 | 0 | 0.2 | 0.2 | 0.3 | 0.3 |
| Zonyl FSO-100 | 0.5 | 0.8 | 0.8 | 0.8 | 0.8 |
| Sensient DMX Black | 0 | 3 | 2.5 | 2.5 | 2.5 |
| TOTAL | 100 | 100 | 100 | 100 | 100 |
| Viscosity @ 25 Degrees C. (cPs) | 3.355 | 2.975 | 2.865 | 2.875 | 3.1 |
| ST @ 25 Degrees C. (mN/m) | 25.25 | 24.2 | 24.35 | 23.6 | 24 |

The viscosities of the inks were measured on a Brookfield™ viscometer Model DV-E with spindle UL Cup at 60 rpm and 25° C. The viscometer may be available from Brookfield Engineering Co. The measured unit of viscosity is centipoises (cPs).

The surface tension (ST) of each of the exemplary inks was measured on a surface tensiometer Model 703 with a DuNoy Ring at 25° C. The tensiometer may be available from KSV Instruments in Finland. The measured unit of surface tension is milli-Newtons per meter (mN/m).

In view of the foregoing, methods of ink-jet printing are also disclosed herein based on aspects of the various ink compositions of the present invention. Such inks may be jetted in continuous ink-jet, conventional ink-jet, bubble-jet, or piezoelectric printers, whether for industrial or office use. As a non-limiting example, the ink may be jetted through a thermal ink-jet system such as the JETPACK 1000™ available from Prism, Inc. As may be appreciated, the aforementioned method serves not as a limitation on the present invention, but is merely illustrative of how an ink composition according to aspects of the present invention may be employed to print on a variety of substrates.

Examples of non-porous substrates to which inks according to aspects of the present invention may be applied include, but are not limited to, polypropylene, polyethylene terephthalate ("PET"), polyethylene, coated glossy paper, and the like. Any such ink jetted from the JETPACK 1000 ™ available from Prism, Inc. produces images with good image quality and contrast displaying good adhesion to non-porous substrates and waterfast properties. The various ink compositions themselves display good decap time during idle state. As the term is employed herein, decap time is the time that the nozzles remain open without forming hard-plugs or crusting upon being in the idle state, i.e., a state where the nozzles are not ejecting ink droplets.

It will be appreciated by those skilled in the art that while a number of specific examples of ink ingredients and compositions have been provided, the present invention is not so limited. Rather, again, while broad categories of ingredients have been provided generally, such as primary and secondary solvents, colorants, surfactants, resins, biocide reagents, and the like, and specific substances within each broad category of ingredients have been described as being combined in certain proportions to yield one or more particular ink compositions, those skilled in the art will appreciate that numerous other substances, now known or later developed, and combinations thereof are possible beyond those described herein without departing from the spirit and scope of the invention. Generally, the various ink compositions according to aspects of the present invention are known to have at least one of the following advantages: stability for jetting from a thermal print head; fast drying without the need for a make-up solution; waterfastness with water-insoluble dye(s) that have good tolerance to water and high optical density; good wetting for printing on non-porous substrates; and economical operation within a relatively inexpensive printing system with low initial cost and low cost of ownership.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventors believe that the claimed subject matter is the invention.

What is claimed is:

1. An ink composition for drop-on-demand printing, the improvement comprising:
   at least one water-insoluble colorant;
   water;
   a primary solvent in which is dissolved both the water-insoluble colorant and the water; and
   a secondary solvent modifying the properties of the ink, the secondary solvent comprising at least two polyols, including a first polyol characterized by being semi-solid at operating temperature and a second polyol characterized by being liquid at operating temperature.

2. The ink composition of claim 1, wherein the primary solvent dissolves at least about two percent by weight (2 wt %) of the colorant and dissolves the water in the range of about five percent by weight (5 wt %) to about ninety-five percent by weight (95 wt %).

3. The ink composition of claim 2, wherein the primary solvent is diacetone alcohol.

4. The ink composition of claim 1, wherein the colorant has at least about two percent solubility by weight (2 wt %) per one hundred grams (100 g) of the primary solvent and has no greater than about one percent solubility by weight (1 wt %) per one hundred grams (100 g) of water.

5. The ink composition of claim 4 wherein the weight percent of the colorant in the ink is in the range of about a half percent (0.5 wt %) to about twelve percent (12 wt %).

6. The ink composition of claim 4, wherein the colorant is selected from the group consisting of Solvent Yellow 2, Solvent Yellow 5, Solvent Yellow 13, Solvent Yellow 14, Solvent Yellow 15, Solvent Yellow 16, Solvent Yellow 18, Solvent Yellow 19, Solvent Yellow 21, Solvent Yellow 33, Solvent Yellow 43, Solvent Yellow 44, Solvent Yellow 51, Solvent Yellow 56, Solvent Yellow 62, Solvent Yellow 72, Solvent Yellow 77, Solvent Yellow 82, Solvent Yellow 90, Solvent Yellow 93, Solvent Yellow 98, Solvent Yellow 109, Solvent Yellow 114, Solvent Yellow 145, Solvent Yellow 163, Solvent Yellow 167, Solvent Yellow 176, Solvent Green 5, Solvent Red 1, Solvent Red 2, Solvent Red 3, Solvent Red 4, Solvent Red 8, Solvent Red 13, Solvent Red 18, Solvent Red 23, Solvent Red 24, Solvent Red 25, Solvent Red 26, Solvent Red 27, Solvent Red 30, Solvent Red 32, Solvent Red 49, Solvent Red 52, Solvent Red 79, Solvent Red 89, Solvent Red 109, Solvent Red 111, Solvent Red 119, Solvent Red 122, Solvent Red 127, Solvent Red 130, Solvent Red 132, Solvent Red 135, Solvent Red 146, Solvent Red 160, Solvent Red 168, Solvent Red 169, Solvent Red 172, Solvent Red 175, Solvent Red 179, Solvent Red 197, Solvent Red 207, Solvent Red 218, Solvent Violet 8, Solvent Violet 9, Solvent Violet 11, Solvent Violet 13, Solvent Violet 14, Solvent Violet 31, Solvent Violet 38, Solvent Violet 56, Solvent Blue 4, Solvent Blue 5, Solvent Blue 6, Solvent Blue 8, Solvent Blue 13, Solvent Blue 23, Solvent Blue 24, Solvent Blue 35, Solvent Blue 36, Solvent Blue 38, Solvent Blue 48, Solvent Blue 58, Solvent Blue 59, Solvent Blue 70, Solvent Blue 74, Solvent Blue 78, Solvent Blue 98, Solvent Blue 102, Solvent Blue 104, Solvent Blue 128, Solvent Green 1, Solvent Green 3, Solvent Green 5, Solvent Orange 20, Solvent Orange 54, Solvent Orange 56, Solvent Orange 58, Solvent Orange 60, Solvent Orange 62, Solvent Orange 63, Solvent Orange 86, Solvent Orange 99, Solvent Brown 41, Solvent Brown 43, Solvent Black 3, Solvent Black 5 (Spirit Nigrosine), Solvent Black 7, Solvent Black 13, Solvent Black 27, Solvent Black 28, Solvent Black 29, and Solvent Black 34.

7. The ink composition of claim 1, wherein the combined weight percent of the primary solvent and the secondary solvent in the ink is in the range of about ten percent (10 wt %) to about ninety percent (90 wt %).

8. The ink composition of claim 1, wherein the secondary solvent further comprises at least one member selected from the group consisting of alcohols, amines, esters, glycol ethers, ketones, polyols, and keto-pyrroles.

9. The ink composition of claim 8, wherein the alcohols are selected from the group consisting of methanol, ethanol, isopropyl alcohol, n-propyl alcohol, tert-butanol, n-pentanol, benzyl alcohol, and derivatives thereof.

10. The ink composition of claim 9 wherein the weight percent of the alcohols in the ink is in the range of about one percent (1 wt %) to about seventy-five percent (75 wt %).

11. The ink composition of claim 8, wherein the amines are selected from the group consisting of ethylenediamine, diethylenetriamine, triethylenetetriamine, diethanolamine, triethanolamine, and derivatives thereof.

12. The ink composition of claim 8, wherein the esters are selected from the group consisting of amyl acetate, iso-butyl acetate, n-butyl acetate, glycol ether DB acetate, glycol ether EB acetate, glycol ether DE acetate, glycol ether EE acetate, glycol ether EM acetate, glycol ether PM acetate, ethyl acetate, ethyl-3-ethoxy propinate, isopropyl acetate, n-propyl acetate, isobutyl isobutyrate, dibasic ester, and derivatives thereof.

13. The ink composition of claim 8, wherein the glycol ethers are selected from the group consisting of propylene glycol methyl ether, dipropylene glycol methyl ether, tripropylene glycol methyl ether, propylene glycol ethyl ether, propylene glycol normal propyl ether, dipropylene glycol normal propyl ether, dipropylene glycol normal butyl ether, dipropylene glycol normal butyl ether, tripropylene glycol normal butyl ether, dipropylene glycol tertiary butyl ether, diethylene glycol methyl ether, diethylene glycol ethyl ether, diethylene glycol butyl ether, and derivatives thereof.

14. The ink composition of claim 8, wherein the keto-pyrroles are selected from the group consisting of n-methyl-2-pyrrolidone, 2-pyrrolidone, and derivatives thereof.

15. The ink composition of claim 1, wherein the polyols are selected from the group consisting of ethylene glycol, diethylene glycol, triethylene glycol, tetraethylene glycol, propylene glycol, dipropylene glycol, tripropylene glycol, glycerol, butanediol, pentanediol, hexanediol, polyethylene glycol 200, polyethylene glycol 400, polyethylene glycol 600, and derivatives thereof.

16. The ink composition of claim 1, further comprising a surfactant selected from the group consisting of hydrocarbon-based surfactants, silicone-based surfactants, or fluorosurfactants.

17. The ink composition of claim 16, wherein at least two surfactants are mixed in the ink either as a fluorosurfactant with a hydrocarbon-based surfactant or as a silicone-based surfactant with a hydrocarbon-based surfactant.

18. The ink composition of claim 16, wherein the weight percent of the surfactant in the ink is in the range of about five hundredths percent (0.05 wt %) to about three percent (3 wt %).

19. The ink composition of claim 1, further comprising a resin selected from the group consisting of acrylic, polyvinyl alcohols, polyvinyl pyrollidone, polyester emulsion, styrene maleic anhydride, cellulose acetate resins, cellulose acetate, polyketone, phenolic, novolac resins, and derivatives thereof.

20. The ink composition of claim 1, further comprising a biocide reagent selected from the group consisting of 2-bromo-2-nitropropane-1,3-diol, 4,4-dimethyloxazolidine, 7-ethyl bicyclooxazolidine, 2,6-dimethyl-m-dioxan-4 of acetate, 1,2-benzisothiazolin-3-one, sodium o-phenylphenate, 1-(3-chloroallyl)-3,5,7-triaza-1-azoniaadamantane chloride, glutaraldehyde, sodium hydroxymethylglycinate, 2[(hydroxymethyl)amino]ethanol, 5-hydroxymethyl-1-aza-3,7-dioxabicyclo(3.3.0)octane, n-methyl-2-hydroxymethyleneoxypropyl-2'-hydroxypropylamine, alkyl amine hydrochlorides, tetrahydro-3,5-dimethyl-2h-1,3,5-thiadiazine-2-thione, tributyltin benzoate, and derivatives thereof.

21. An ink composition for drop-on-demand printing, the improvement comprising:
at least one water-insoluble colorant present in the ink by weight percent in the range of about a half percent (0.5 wt %) to about twelve percent (12 wt %);
water;
a primary solvent in which is dissolved the water in the range of about five percent by weight (5 wt %) to about ninety-five percent by weight (95 wt %), the colorant having at least about two percent solubility by weight (2 wt %) per one hundred grams (100 g) of the primary solvent and having no greater than about one percent solubility by weight (1 wt %) per one hundred grams (100 g) of water; and
a secondary solvent modifying the properties of the ink, the secondary solvent comprising at least two polyols, including a first polyol characterized by being semi-solid at operating temperature and a second polyol characterized by being liquid at operating temperature.

22. An ink composition for drop-on-demand printing, the improvement comprising:
at least one water-insoluble colorant present in the ink by weight percent in the range of about a half percent (0.5 wt %) to about twelve percent (12 wt %);
water;
a primary solvent in which is dissolved the water in the range of about five percent by weight (5 wt %) to about ninety-five percent by weight (95 wt %), the colorant having at least about two percent solubility by weight (2 wt %) per one hundred grams (100 g) of the primary solvent and having no greater than about one percent solubility by weight (1 wt %) per one hundred grams (100 g) of water;
a secondary solvent modifying the properties of the ink, the secondary solvent comprising at least two polyols, including a first polyol characterized by being semi-solid at operating temperature and a second polyol characterized by being liquid at operating temperature; and
at least two surfactants mixed in the ink either as a fluorosurfactant with a hydrocarbon-based surfactant or as a silicone-based surfactant with a hydrocarbon-based surfactant, the combined weight percent of the surfactants in the ink being in the range of about five hundredths percent (0.05 wt %) to about three percent (3 wt %).

23. An ink composition for drop-on-demand printing, the improvement comprising:
diacetone alcohol;
water;
at least one water-insoluble colorant present in the ink by weight percent in the range of about a half percent (0.5 wt %) to about twelve percent (12 wt %), the colorant having at least about two percent solubility by weight (2 wt %) per one hundred grams (100 g) of diacetone alcohol and having no greater than about one percent solubility by weight (1 wt %) per one hundred grams (100 g) of water;
a first polyol characterized by being semi-solid at operating temperature;
a second polyol characterized by being liquid at operating temperature; and
at least two surfactants mixed in the ink either as a fluorosurfactant with a hydrocarbon-based surfactant or as a silicone-based surfactant with a hydrocarbon-based surfactant, the combined weight percent of the surfactants in the ink being in the range of about five hundredths percent (0.05 wt %) to about three percent (3 wt %).

24. A drop-on-demand printing system for printing on a variety of porous and non-porous substrates, the system including at least one print head having at least one nozzle from which is jetted an ink supplied from a reservoir, the improvement in the ink composition added to the reservoir comprising:
at least one water-insoluble colorant;
water;
a primary solvent in which is dissolved both the water-insoluble colorant and the water; and
a secondary solvent modifying the properties of the ink, the secondary solvent comprising at least two polyols, including a first polyol characterized by being semi-solid at operating temperature and a second polyol characterized by being liquid at operating temperature.

25. A drop-on-demand printing system for printing on a variety of porous and non-porous substrates, the system including at least one print head having at least one nozzle from which is jetted an ink supplied from a reservoir, the improvement in the ink composition added to the reservoir comprising a means for forming a soft plug in the ink substantially at the nozzle during latency so as to reduce evaporative loss of the ink and crusting of the ink at the nozzle, wherein the ink includes:
at least one water-insoluble colorant;
water;
a primary solvent in which is dissolved both the water-insoluble colorant and the water and the soft-plug forming means; and
a secondary solvent defining the soft-plug forming means and modifying the properties of the ink, the secondary solvent comprising at least two polyols, including a first polyol characterized by being semi-solid at operating temperature and a second polyol characterized by being liquid at operating temperature.

26. A drop-on-demand printing system for printing on a variety of porous and non-porous substrates, the system including at least one print head having at least one nozzle from which is jetted an ink supplied from a reservoir, the improvement in the ink composition added to the reservoir comprising at least two surfactants mixed in the ink either as a fluorosurfactant with a hydrocarbon-based surfactant or as a silicone-based surfactant with a hydrocarbon-based surfactant, the combined weight percent of the surfactant in the ink being in the range of five hundredths percent (0.05 wt %) to about three percent (3 wt %), wherein the ink includes:
- at least one water-insoluble colorant;
- water; and
- a primary solvent in which is dissolved both the water-insoluble colorant and the water and the at least two surfactants; and
- a secondary solvent modifying the properties of the ink, the secondary solvent comprising at least two polyols, including a first polyol characterized by being semi-solid at operating temperature and a second polyol characterized by being liquid at operating temperature.

27. A method of applying ink to a substrate using a drop-on-demand printing system, comprising the steps of:
- adding an ink to a reservoir of the system, the ink comprising at least one water-insoluble colorant, water, a primary solvent in which is dissolved both the water-insoluble colorant and the water, and a secondary solvent modifying the properties of the ink, the secondary solvent comprising at least two polyols, including a first polyol characterized by being semi-solid at operating temperature and a second polyol characterized by being liquid at operating temperature; and
- jetting the ink from the reservoir onto the substrate.

28. The method of claim 27, comprising the further step of forming a soft plug in the ink substantially at a nozzle of the system during latency so as to reduce evaporative loss of the ink and crusting of the ink at the nozzle.

29. The method of claim 27, comprising the further step of stabilizing drop formation of the ink at the nozzle during jetting by mixing into the ink either a fluorosurfactant with a hydrocarbon-based surfactant or a silicone-based surfactant with a hydrocarbon-based surfactant.

* * * * *